July 21, 1953     L. B. DENNISON     2,646,093
METHOD OF FORMING IMITATION HAND RIFT SHINGLES
Filed Oct. 14, 1948

Inventor
Lee B. Dennison
By
Attorney

Patented July 21, 1953

2,646,093

UNITED STATES PATENT OFFICE 2,646,093

METHOD OF FORMING IMITATION HAND RIFT SHINGLES

Lee B. Dennison, Fernwood, Idaho

Application October 14, 1948, Serial No. 54,401

2 Claims. (Cl. 144—309)

My present invention relates to an improved method of forming imitation hand rift shingles and especially to the method of grooving the shingles along a part of their length only to simulate the hand split shingles, the appearance of which is desirable but costly.

According to my invention the squared block cut from the tree is fed successively by a conveyor system past the grooving device, the sawing device, and then is returned to the grooving device and follows the sequence until the block has been entirely cut and each shingle grooved.

In the accompanying drawings I have illustrated one complete example of the physical embodiment of my invention according to the best mode I have thus far devised, but it will be understood that various changes and alterations may be made in the exemplified structure within the scope of the appended claims.

Figures 1, 2, 3, 4:
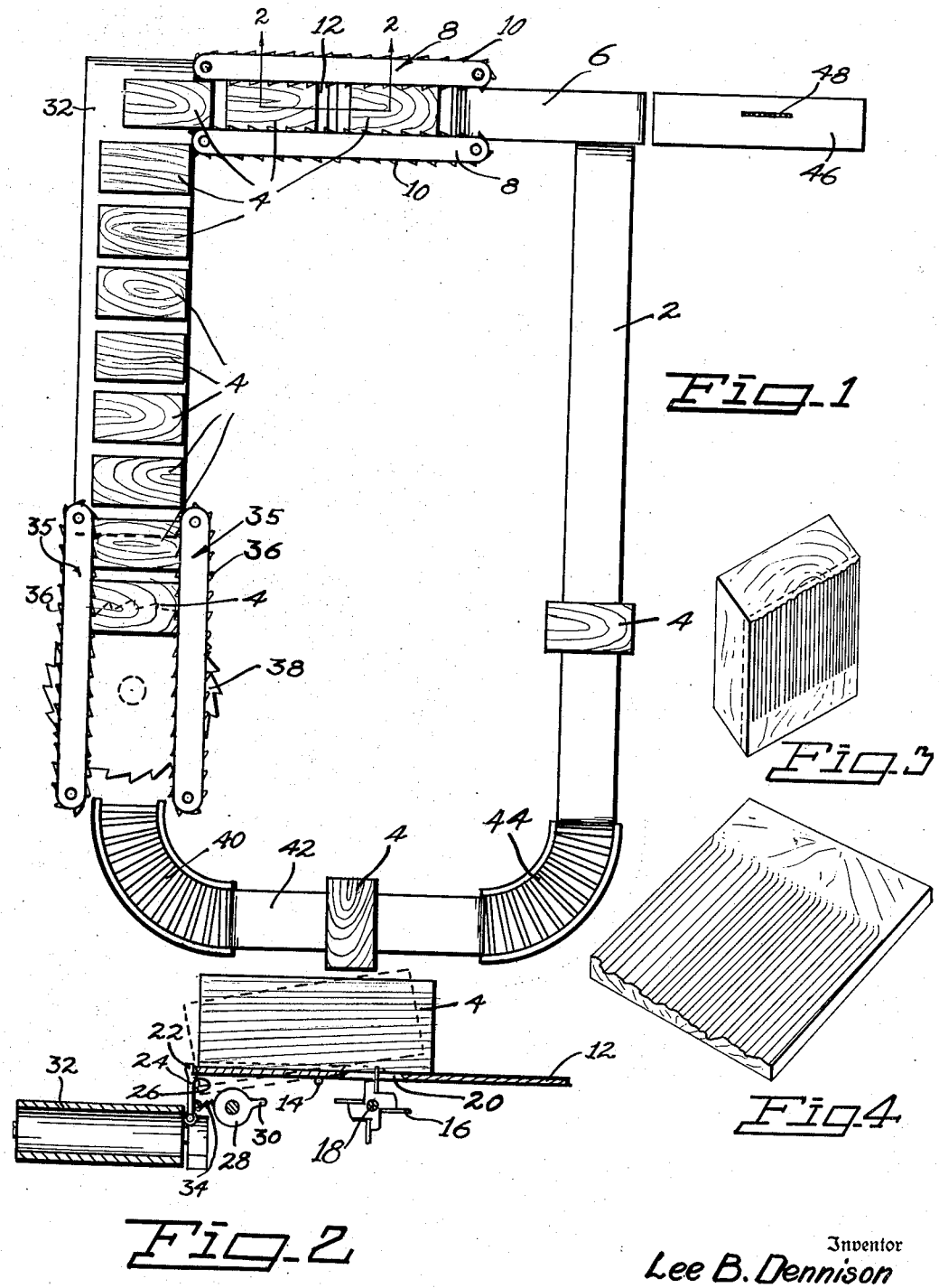
Fig. 1 is a plan view of the conveyor system employed in carrying out my method.
Fig. 2 is a sectional view at line 2—2 of Fig. 1 showing the block-tilting mechanism for clearing the block of the grooving knife after the desired length groove has been cut.
Fig. 3 is a perspective view of a block from which shingles are cut.
Fig. 4 is a perspective view of a shingle cut from the block shown in Figure 3.

Referring now to the drawings wherein I have illustrated the present preferred embodiment of my invention I employ a suitable belt conveyor 2 upon which are placed the blocks 4 of wood which normally are sawed square on all sides except one.

These blocks are fed by the conveyor belt 2 to conveyor 6 at right angles thereto and the blocks are engaged by the endless chains 8 having teeth 10 moving the blocks over platform 12 pivoted at 14. While the blocks are being fed over the platform the rotary knives 16 which are mounted on shaft 18 and extend through slot 20 in the platform form grooves 4a in the block on the under side, and in order to limit the grooving the platform is automatically tilted so that the rear portion of the under face of the block clears the cutters.

This tilting is effected by the front end of the block engaging the nose 22 of link 24, which has a shoulder 26 supporting the platform, and when the block moves the nose and the link the platform drops or tilts on its fulcrum raising the after end of the block. The rotary collar 28 has a cam lug 30 which raises the platform after the block has slid onto conveyor belt 32 and the spring 34 assures the supporting engagement of the platform and shoulder.

Belt 32 carries the block to the chains 35 having teeth 36 which move the block against the rotary saw 38 whereupon the shake or shingle 5 is cut or sawed from the block, one face thereof being grooved, and the block continues to curved conveyor 40 and belt 42 to curved conveyor 44 from which it is returned to belt 2, the block having been turned 180 degrees upon its vertical axis. The sequential movement follows as outlined above.

The sequence continues until the block is cut to the uneven edge which is then squared on table 46 having a saw 48, and again placed on belt 6.

By employing the apparatus described I am enabled to carry out the process wherein the block is grooved partially, the shake is cut, and the block reversed 180 degrees and then returned to be grooved and cut.

By utilizing my method of grooving first and then cutting, the tendency resulting from the present method wherein the steps are reversed to fray the thin edge of the shake is eliminated, and the desirable shake simulating hand split shakes is made with facility and ease.

Having thus fully described my invention what I claim as new and desire to secure by Letters Patent is:

1. The process of forming imitation hand rift shingles comprising forming a block of wood having flat upper and lower faces and side faces, forming in one face of the block a multiplicity of grooves extending longitudinally of the block in side by side relation to each other, and then cutting the block for its full length and width in predetermined spaced relation to its grooved face and thereby removing from the block a strip constituting shingle having a grooved surface.

2. The process of forming imitation hand rift shingles comprising forming an elongated block of wood having flat upper and lower faces and side faces, forming a multiplicity of grooves extending longitudinally in the lower face of the block in side by side relation to each other from one end of the block and terminating the grooves in spaced relation to the other end of the block, and then cutting the block for its full length and width in predetermined spaced relation to the grooved face thereof to remove a strip constituting a shingle having a grooved surface formed by the said grooved face of the block.

LEE B. DENNISON.

References Cited in the file of this patent

UNITED STATES PATENTS

| Number | Name | Date |
|---|---|---|
| 1,677,822 | Gulliford | July 17, 1928 |
| 1,683,751 | Abbott | Sept. 11, 1928 |
| 1,720,841 | Jones | July 16, 1929 |
| 1,976,171 | Hutchings | Oct. 9, 1934 |